(12) United States Patent
Matsuda et al.

(10) Patent No.: US 9,206,079 B2
(45) Date of Patent: *Dec. 8, 2015

(54) CHEMICALLY STRENGTHENED GLASS PLATE AND METHOD FOR MANUFACTURING SAME

(71) Applicant: CENTRAL GLASS COMPANY, LIMITED, Yamaguchi (JP)

(72) Inventors: Yu Matsuda, Mie (JP); Tatsuya Tsuzuki, Mie (JP); Naoki Mitamura, Mie (JP); Tadashi Muramoto, Mie (JP)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/343,165

(22) PCT Filed: Sep. 27, 2012

(86) PCT No.: PCT/JP2012/074929
§ 371 (c)(1),
(2) Date: Mar. 6, 2014

(87) PCT Pub. No.: WO2013/047679
PCT Pub. Date: Apr. 4, 2013

(65) Prior Publication Data
US 2014/0234607 A1 Aug. 21, 2014

(30) Foreign Application Priority Data

Sep. 29, 2011 (JP) ................................. 2011-215606
Jun. 21, 2012 (JP) ................................. 2012-139804

(51) Int. Cl.
*C03C 21/00* (2006.01)
*C03C 3/087* (2006.01)

(52) U.S. Cl.
CPC .............. *C03C 21/002* (2013.01); *C03C 3/087* (2013.01); *C03C 21/00* (2013.01); *C03C 21/001* (2013.01); *Y10T 428/315* (2015.01)

(58) Field of Classification Search
CPC .. C03C 21/001; C03C 21/002; Y10T 428/315
USPC ................................ 65/30.13, 30.14; 428/410
See application file for complete search history.

(56) References Cited

U.S. PATENT DOCUMENTS 3,433,611 A * 3/1969 Kubichan et al. ............ 65/30.14
3,506,423 A   4/1970 Morris
(Continued)

FOREIGN PATENT DOCUMENTS

CN      1759074 A    4/2006
CN    100465119 C    3/2009
(Continued)

OTHER PUBLICATIONS

International Search Report issued Dec. 25, 2012 in International (PCT) Application No. PCT/JP2012/074929.
(Continued)

*Primary Examiner* — Aaron Austin
*Assistant Examiner* — Zheren J Yang
(74) *Attorney, Agent, or Firm* — Wenderoth, Lind & Ponack, L.L.P.

(57) ABSTRACT

The present invention aims to provide a chemically strengthened glass plate which has a good yield in a cutting process of the chemically strengthened glass plate and has sufficient strength. The chemically strengthened glass plate has a surface compressive stress of not less than 600 MPa at a surface of the chemically strengthened glass plate, and a compressive stress layer containing two types of stress patterns A and B. The stress pattern A is a stress pattern of a surface portion of the glass plate, and the stress pattern B is a stress pattern of an inside of the glass plate. The stress patterns satisfy the formula $S_A > S_B$ where $S_A$ represents a slope of the stress pattern A and $S_B$ represents a slope of the stress pattern B when the stress patterns A and B are each approximated by a linear function.

9 Claims, 3 Drawing Sheets

(56) References Cited

U.S. PATENT DOCUMENTS

| | | | | |
|---|---|---|---|---|
| 3,630,704 | A | * | 12/1971 | Garfinkel et al. ............ 65/30.14 |
| 3,798,013 | A | * | 3/1974 | Inoue et al. ................. 65/30.14 |
| 4,273,832 | A | | 6/1981 | Hogan |
| 4,671,814 | A | * | 6/1987 | Aratani et al. ................ 428/410 |
| 4,897,371 | A | | 1/1990 | Suzuki et al. |
| 6,516,634 | B1 | * | 2/2003 | Green et al. ................. 65/30.14 |
| 2007/0060465 | A1 | * | 3/2007 | Varshneya et al. .............. 501/68 |
| 2010/0009154 | A1 | * | 1/2010 | Allan et al. ................... 428/220 |
| 2010/0028607 | A1 | * | 2/2010 | Lee et al. ..................... 428/156 |
| 2010/0035038 | A1 | * | 2/2010 | Barefoot et al. ............. 428/220 |
| 2011/0274916 | A1 | | 11/2011 | Murata |
| 2011/0293942 | A1 | * | 12/2011 | Cornejo et al. ............... 428/410 |
| 2012/0052271 | A1 | * | 3/2012 | Gomez et al. ................ 428/213 |
| 2012/0214004 | A1 | * | 8/2012 | Hashimoto et al. .......... 428/428 |
| 2012/0247152 | A1 | | 10/2012 | Ohara et al. |
| 2013/0183512 | A1 | | 7/2013 | Gy et al. |
| 2013/0224492 | A1 | * | 8/2013 | Bookbinder et al. ......... 428/410 |
| 2014/0087193 | A1 | * | 3/2014 | Cites et al. .................... 428/410 |
| 2014/0141217 | A1 | * | 5/2014 | Gulati et al. .................. 428/212 |
| 2014/0227524 | A1 | * | 8/2014 | Ellison et al. ................. 428/410 |
| 2015/0147574 | A1 | * | 5/2015 | Allan et al. ................... 428/410 |

FOREIGN PATENT DOCUMENTS

| | | |
|---|---|---|
| CN | 101928110 A | 12/2010 |
| FR | 2 964 655 | 3/2012 |
| GB | 1096356 | 12/1967 |
| JP | 47-14837 | 5/1972 |
| JP | 54-17765 | 7/1979 |
| JP | 61-205639 | 9/1986 |
| JP | 62-100458 | 5/1987 |
| JP | 62-270439 | 11/1987 |
| JP | 64-83539 | 3/1989 |
| JP | 1-203244 | 8/1989 |
| JP | 8-18850 | 2/1996 |
| JP | 8-48537 | 2/1996 |
| JP | 2002-160932 | 6/2002 |
| JP | 2004-83378 | 3/2004 |
| JP | 2004-352535 | 12/2004 |
| JP | 2004-359504 | 12/2004 |
| JP | 2007-51064 | 3/2007 |
| JP | 2008-195602 | 8/2008 |
| JP | 2008-247732 | 10/2008 |
| JP | 4535692 | 6/2010 |
| JP | 2010-275126 | 12/2010 |
| JP | 2011-133800 | 7/2011 |
| JP | 2011-213576 | 10/2011 |
| JP | 2011-529438 | 12/2011 |
| JP | 2011-530470 | 12/2011 |
| WO | 2010/014163 | 2/2010 |
| WO | 2010/016928 | 2/2010 |

OTHER PUBLICATIONS

International Search Report issued Jan. 15, 2013 in International (PCT) Application No. PCT/JP2012/074925.

International Search Report issued Jan. 22, 2013 in International (PCT) Application No. PCT/JP2012/074926.

David E. Clark et al., "Processing Materials with Microwave Energy", Materials Science and Engineering A, vol. 287, No. 2, 2000, pp. 153-158 (XP008125077).

Stefan Karlsson et al., "Surface Analysis of Float Glass Using Surface Ablation Cell (SAC). Part 2. Determination of the Diffusion Characteristics of $K^+$-$Na^+$ Ion Exchange", Glass Technology, vol. 51, No. 2, 2010, pp. 55-62, (XP001553386).

Harmon Garfinkel, "Strengthening Glass by Ion Exchange", The Glass Industry, vol. 50, No. 2, 1969, pp. 74-76 (XP001251178).

Junwu Shen et al., "Control of Concentration Profiles in Two Step Ion Exchanged Glasses", Physics and Chemistry of Glasses, vol. 44, No. 4, 2003, pp. 284-292 (XP001174924).

Vincenzo M. Sglavo et al., "Engineered Stress-Profile Silicate Glass: High Strength Material Insensitive to Surface Defects and Fatigue", Advanced Engineering Materials, vol. 6, No. 5, 2004, pp. 344-349 (XP055048650).

A. L. Zijlstra et al., "Fracture Phenomena and Strength Properties of Chemically and Physically Strengthened Glass", Journal of Non-Crystalline Solids, 1968, pp. 49-68, (XP001274099).

Stefan Karlsson et al., "The Technology of Chemical Glass Strengthening—A Review", Glass Technology, vol. 51, No. 2, 2010, pp. 41-54 (XP001553385).

* cited by examiner (a)

(b)

(c)

CHEMICALLY STRENGTHENED GLASS PLATE AND METHOD FOR MANUFACTURING SAME

TECHNICAL FIELD

The present invention relates to a chemically strengthened glass plate, specifically a chemically strengthened glass plate suitable for cover glasses or integrated cover glasses having functions of both a substrate and a cover glass for display devices (including display devices having functions of an input arrangement) of electric devices (e.g. mobile phones, smartphones, tablet computers).

BACKGROUND ART

Resin covers are widely used as display protectors for mobile electronic devices such as mobile phones and smartphones. Such resin covers, however, are exceeded by those made of glass in terms of excellence in transmittance, weather resistance, and damage resistance, and additionally, glass improves the aesthetics of displays. Accordingly, there has been an increasing demand for display protectors made of glass in recent years. Furthermore, a trend toward thinner and lighter mobile devices has naturally created a demand for thinner cover glasses. A cover glass is a component that has an exposed surface, and therefore is susceptible to cracking when exposed to an impact (e.g. contact with a hard object, dropping impact). Obviously, the thinner the cover glass is, the higher the probability of cracking is. Accordingly, a demand for a glass with sufficient mechanical strength is increasingly growing.

A possible strategy to solve the above problem is to improve the strength of cover glasses. The following two methods for strengthening glass plates have been known: thermal strengthening (physical strengthening); and chemical strengthening.

The former method (i.e. thermal strengthening) involves heating a glass plate nearly to its softening point and rapidly cooling the surface thereof with a cool blast or the like. Unfortunately, this thermal strengthening method, when performed on a thin glass plate, is less likely to establish a large temperature differential between the surface and the inside of the glass plate, and therefore less likely to provide a compressive stress layer at the glass plate surface. Thus, this method fails to provide desired high strength. Another fatal problem is that processing (e.g. cutting) of a thermally strengthened glass plate is difficult because the glass plate will shatter when a preliminary crack for cutting is formed on the surface. Additionally, as opposed to the above-mentioned demand for thinner cover glasses, the thermal strengthening method fails to provide desired high strength when performed on a thin glass plate because this method is less likely to establish a large temperature differential between the surface and the inside of the glass plate, and therefore less likely to provide a compressive stress layer at the glass plate surface. Accordingly, cover glasses strengthened by the latter method (i.e. chemical strengthening) are generally used instead.

The chemical strengthening method involves contacting a glass plate containing an alkali component (e.g. sodium ions) with a molten salt containing potassium ions to cause ion exchange between the sodium ions in the glass plate and the potassium ions in the molten salt, thereby forming a compressive stress layer for improving the mechanical strength at a surface layer of the glass plate. In the glass plate subjected to this method, potassium ions, which have a larger ionic radius than sodium ions, in the molten salt have replaced sodium ions in the glass plate, and thus are incorporated in a surface layer of the glass plate, which is accompanied by a volume expansion of the surface layer. Under the temperature conditions of this method, the glass cannot flow in a viscous manner at a speed high enough to relax the expansion. Consequently, the expansion remains as volume compressive residual stress in the surface layer of the glass plate, and improves the strength.

Surface compressive stress and depth of a compressive stress layer can be used as measures of the strength of chemically strengthened glasses.

The term "surface compressive stress" or simply "compressive stress" refers to compressive stress in the outermost layer of a glass plate, which is generated by incorporation of ions having a larger volume into a surface layer of the glass plate by ion exchange. A compressive stress cancels tensile stress that is a factor of breaking glass plates, and thus contributes to higher strength of chemically strengthened glass plates than that of other glass plates. Accordingly, the surface compressive stress can be used as a direct measure for the improvement of the strength of glass plates.

The "depth of a compressive stress layer" or simply "depth of layer" refers to the depth of a region where a compressive stress is present, as measured from the outermost surface of the glass plate as a standard. A deeper compressive stress layer corresponds to higher ability to prevent a large microcrack (crack) on the surface of the glass plate from growing, in other words, higher ability to maintain the strength against damage.

In addition to their thin but highly strengthened glass plate structures, another reason why chemically strengthened glass plates are commercially popular is that these glasses can be cut although they are already strengthened. In contrast, processing (e.g. cutting) of a glass plate already strengthened by the thermal strengthening method is difficult because the plate will shatter when a preliminary crack for cutting is formed on the surface.

It is generally known that thermally strengthened glass plates have a compressive stress layer having a depth of about $\frac{1}{6}$ of the entire plate thickness at each surface of the glass. Strong tensile stress occurs in the inside glass region under this deep compressive stress layer to achieve a mechanical balance with the compressive stress in the compressive stress layer. If a preliminary crack for cutting the glass is formed to reach the tensile stress region, the tensile stress automatically propagates the crack to shatter the glass. This is why thermally strengthened glass plates cannot be cut.

On the other hand, a chemically strengthened glass plate is prepared by ion exchange in a micrometer-order thin superficial layer of the glass plate. Therefore, strictly speaking, the ion exchange depends on Fick's law of diffusion, but is often approximated by a linear function. As for chemically strengthened glass plates, their compressive stress layers and surface compressive stresses can be controlled by changing ion exchange conditions, and the compressive stress layers are very thin compared to those of thermally strengthened glass plates. Namely, the compressive stress layers and the surface compressive stresses of the chemically strengthened glasses can be controlled to avoid strong tensile stress that automatically propagates and leads to shatter of the glasses even when a preliminary crack for cutting is formed on the glass plate. This is why general chemically strengthened glasses can be cut.

Chemically strengthened glass plates can be cut as described above, but with great difficulty. Such cut difficulty causes breakage of glass plates to result in reduction of the yield of the resulting products. Therefore, chemical strengthening of preliminary cut glasses has been suggested (e.g. Patent Literature 1).

On the other hand, a trend toward lighter and thinner touch panels has naturally created a demand for chemically strengthened glass plates with higher strength. Therefore, for example, Patent Literatures 2 to 4 have suggested aluminosilicate glass as glasses suitable for chemical strengthening with a high ion exchange rate.

Further, in order to improve the cutting easiness of chemically strengthened glass plates, a method of relaxing a compressive stress of the outermost surface of a glass by a post treatment such as heating of the surface of a glass after chemical strengthening (e.g. Patent Literature 5) has been suggested.

CITATION LIST

Patent Literature

Patent Literature 1: JP 2002-160932 A
Patent Literature 2: JP H08-048537 A
Patent Literature 3: JP 2011-213576 A
Patent Literature 4: JP 2011-530470 T
Patent Literature 5: JP 4535692 B

SUMMARY OF INVENTION

Technical Problem

Cover glasses such as touch panels have a small area. Therefore, operation of chemical strengthening of preliminary cut glasses becomes complicated to significantly reduce the productivity, which leads to an increase in costs.

Regarding a recent manufacturing manner of touch panels, an integrated cover glass has been developed which is a single cover glass equipped with touch sensors thereon having functions of both a cover glass and a touch panel. Manufacturing of such an integrated cover glass includes forming touch sensors on a chemically strengthened large glass plate, and subsequently cutting the glass plate into cover glasses in a certain shape. In this case, the cutting processability of the chemically strengthened glass plate is required.

However, a chemically strengthened glass made of aluminosilicate glass, which has a high ion exchange rate, has too high a surface compressive stress and too deep a compressive stress layer, and further has high Vickers hardness. For this reason, a crack for cutting may not be formed on a surface of the glass by scribing using a cutting machine with a carbide wheel glass cutter, and the glass may become difficult to cut. Even if a crack can be formed on a surface of the glass, too high a surface compressive stress and too deep a compressive stress layer cause a relatively high tensile stress at a region with an inner tensile stress which is located deeper than the compressive stress layer. Therefore, a crack for cutting automatically propagates. Thus, a lot of problems in glass cutting occur, such as no split of the glass along a scribe line, fracture of the glass not along a scribe line, and chipping of the glass. Such problems cause reduction in yield in a cutting process of a chemically strengthened glass.

As described above, it is practically hard to say that technical studies have been made so far on development for a chemically strengthened glass plate in view of strength and a yield in a cutting process of a chemically strengthened glass plate.

Specifically, Patent Literature 1 has disclosed chemical strengthening of a glass plate preliminary cut, but this method cannot increase the productivity of cut glasses because the method is not to produce a plurality of cut glasses at the same time from a chemically strengthened single large glass plate.

Patent Literature 2 has disclosed a chemically strengthened glass plate having a high ion exchange rate, a deep compressive stress layer, and excellent water resistance. Patent Literature 3 has disclosed a chemically strengthened glass plate having a high surface compressive stress, a deep compressive stress layer, and a low crack generation rate. However, the yield in a cutting process of the chemically strengthened glass plate has not been examined in this literature.

Patent Literature 4 has disclosed an inner tensile stress and brittleness of a glass plate in which a deep compressive stress layer is likely to be formed. However, the strength and the yield in a cutting process of a chemically strengthened glass plate have not been examined in the literature.

Patent Literature 5 has disclosed a chemically strengthened glass having a compressive stress layer that has a stress pattern A which is a pattern of a portion near a surface of the glass, and a stress pattern B which is a pattern of a portion on the inner layer side of the glass, for improvement of the yield in a cutting process of the chemically strengthened glass. When the stress patterns A and B are each approximated by a linear function, the slope of the stress pattern A is smaller than that of the stress pattern B. These stress patterns are effective to reduce an accumulated compressive stress of the compressive stress layer and an inner tensile stress, but do not provide a high surface compressive stress because relaxation of the compressive stress of the outermost surface of the glass is performed as a post treatment. Therefore, such a chemically strengthened glass has a problem in that the yield in a cutting process of the chemically strengthened glass and the strength are not improved at the same time.

Further, the higher the compressive stress of the surface of a chemically strengthened glass plate, the higher the inner tensile stress needed to balance with an accumulated compressive stress in the compressive stress layer. Such a state is remarkably shown in a thinner glass plate because a space between the inner tensile stress layers becomes smaller in a thinner glass plate to cause an increase in an inner tensile stress.

For this reason, a thinner chemically strengthened glass plate which can be cut with a good yield in a cutting process and has sufficient strength at the same time is much needed, but is not achieved by conventional manners.

In order to solve the conventional problems, the present invention aims to provide a chemically strengthened glass plate which has a good yield in a cutting process of the chemically strengthened glass plate and has sufficient strength.

Solution to Problem

A chemically strengthened glass plate of the present invention manufactured by ion exchange of a surface of a glass plate to replace alkali metal ions A which are the largest in amount among all the alkali metal ion components of the glass plate with alkali metal ions B having a larger ionic radius than the alkali metal ions A, the chemically strengthened glass plate having:
a surface compressive stress of not less than 600 MPa at a surface of the chemically strengthened glass plate; and
a compressive stress layer containing two types of stress patterns A and B, the stress pattern A being a stress pattern of a surface portion of the glass plate, the stress pattern B being a stress pattern of an inside of the glass plate, wherein the stress patterns satisfy the formula $S_A > S_B$ where $S_A$ represents a slope of the stress pattern A and $S_B$ represents a slope of the stress pattern B when the stress patterns A and B are each approximated by a linear function.

The chemically strengthened glass plate of the present invention has a surface compressive stress at the surface of the glass of not less than 600 MPa.

Therefore, the chemically strengthened glass plate of the present invention has sufficient strength.

A glass having a surface compressive stress of less than 600 MPa has reduced average strength, and is susceptible to breaking when exposed to an impact (e.g. contact with a hard object, dropping impact).

However, it is considered that a higher surface compressive stress generally increases an inner tensile stress needed to balance with an accumulated compressive stress in the compressive stress layer.

The most important feature of the chemically strengthened glass plate of the present invention is that it has a high surface compressive stress, and has a reduced accumulated compressive stress in the compressive stress layer, thereby having an improved yield in a cutting process of the chemically strengthened glass plate and high strength at the same time.

To achieve the feature, the chemically strengthened glass plate of the present invention has a compressive stress layer containing two types of stress patterns A and B. The stress pattern A is a stress pattern of a surface portion of the glass plate, and a stress pattern B is a stress pattern of an inside of the glass plate.

In particular, the stress patterns satisfy the formula $S_A > S_B$ where $S_A$ represents a slope of the stress pattern A and $S_B$ represents a slope of the stress pattern B when the stress patterns A and B are each approximated by a linear function. Accordingly, an accumulated compressive stress in the compressive stress layer can be reduced while maintaining the surface compressive stress high.

FIG. 1 is a graph schematically showing a relationship between slopes of stress patterns and an accumulated compressive stress in a compressive stress layer.

In FIG. 1, the solid line shows linear functions obtained by approximating the stress patterns in the chemically strengthened glass plate of the present invention.

As shown in FIG. 1, the chemically strengthened glass plate of the present invention has a compressive stress layer containing two types of stress patterns A and B. The stress pattern A is a stress pattern of a surface portion of the glass plate, and the stress pattern B is a stress pattern of an inside of the glass plate. The stress patterns satisfy the formula $S_A > S_B$ where $S_A$ represents a slope of the stress pattern A and $S_B$ represents a slope of the stress pattern B.

In a graph shown in FIG. 1, the dashed line shows a constant slope of a stress pattern, that is, a slope of only one type of stress pattern.

As shown in FIG. 1, in the chemically strengthened glass plate of the present invention, the accumulated compressive stress in the compressive stress layer can be reduced without changing the surface compressive stress σ and the depth d of the compressive stress layer.

As described above, an accumulated compressive stress in the compressive stress layer is balanced with an accumulated inner tensile stress in the tensile stress layer in the chemically strengthened glass plate.

Therefore, it is assumed that the chemically strengthened glass plate of the present invention has both a high surface compressive stress and a low inner tensile stress. For this reason, the effects of improvement in the yield in a cutting process of the chemically strengthened glass plate and the high strength are achieved at the same time.

The term "the slope of a stress pattern" herein means an absolute value of a slope of a compressive stress relative to a depth of a glass from the surface of the glass.

Therefore, a stress pattern with a large slope is steep and a stress pattern with a small slope is gentle.

The compressive stress in the compressive stress layer decreases towards an inside of the glass from the surface of the glass. Therefore, the slopes of the stress patterns A and B have the same sign.

The slopes of stress patterns may be determined as follows, regardless of the shapes of the stress patterns: the stress patterns approximated by a linear function drawn from the surface of the grass is defined as stress pattern A, the stress patterns approximated by a linear function drawn from the inside of the grass is defined as stress pattern B. The slopes of the linear functions A and B are determined.

In the chemically strengthened glass plate of the present invention, when an interference pattern of the chemically strengthened glass plate is observed with a surface stress meter based on a principle of an optical waveguide effect, at least one of values $r_2/r_1$ and $r_3/r_2$ is preferably in the range of 0.3 to 0.7, where $r_1$ represents an interval between a line of the interference pattern closest to the surface of the glass, and a line of the interference pattern second closest to the surface; $r_2$ represents an interval between the line of the interference pattern second closest to the surface, and a line of the interference pattern third closest to the surface; and $r_3$ represents an interval between the line of the interference pattern third closest to the surface, and a line of the interference pattern fourth closest to the surface.

In the chemically strengthened glass plate of the present invention, ratios $r_2/r_1$ and $r_3/r_2$ are evaluated as a measure for evaluating the slope of the stress pattern. Here, when an interference pattern of the chemically strengthened glass plate is observed with a surface stress meter based on a principle of an optical waveguide effect, $r_1$ represents an interval between a line (bright line) of the interference pattern closest to the surface of the glass, and a line of the interference pattern second closest to the surface; $r_2$ represents an interval between the line of the interference pattern second closest to the surface, and a line of the interference pattern third closest to the surface; and $r_3$ represents an interval between the line of the interference pattern third closest to the surface, and a line of the interference pattern fourth closest to the surface.

The relationship of intervals between lines of an interference pattern and the slope of a stress pattern are explained below.

FIGS. 2(a), 2(b), and 2(c) are graphs each schematically showing the relationship of intervals between lines of an interference pattern and a slope of a stress pattern.

As shown in FIGS. 2(a), 2(b), and 2(c), the slope of a stress pattern is derived from the intervals.

Specifically, when each interval is wide as shown in FIG. 2(a), the slope of a stress pattern is large. On the other hand, when each interval is narrow as show in FIG. 2(b), the slope of a stress pattern is small. FIG. 2(c) shows a stress pattern of a combination of FIGS. 2(a) and 2(b). In cases where a stress pattern is approximated by two linear functions with different slopes, the relationship between changes of intervals and changes of the slope of a stress pattern can be observed. Information on the slope of the stress pattern can be obtained from such observation of the intervals.

In cases where the ratio $r_2/r_1$ is close to 1, the interval $r_2$ between the line second closest to the surface of the glass and the line third closest to the surface is similar to the interval $r_1$ between the line closest to the surface of the glass and the line second closest to the surface. In cases where the ratio $r_2/r_1$ is smaller than 1, the smaller ratio $r_2/r_1$ means that the interval $r_2$ is smaller than the interval $r_1$. The same shall apply to the ratio $r_3/r_2$.

Ion exchange basically follows Fick's law of diffusion, and the law of diffusion is not a linear function. Therefore, a stress pattern is not strictly represented by a straight line. As for the relationship between an interval and a stress pattern, approximation of a stress pattern by a sequence of interval which is related to at least one of the values $r_2/r_1$ and $r_3/r_2$ is more accurate than approximation by a straight line. The approximation by the sequence of the interval allows easy manufacturing control.

Thus, in cases where at least one of the values $r_2/r_1$ and $r_3/r_2$ is in the range of 0.3 to 0.7 in the chemically strengthened glass plate of the present invention, the stress drastically reduces on the surface side of the glass, whereas a rate of reduction of the stress becomes lower towards the inside of the glass. This shows approximately the changes of the slopes of the stress patterns of the present invention, as shown in FIG. 1.

Therefore, the relationship $S_A > S_B$ is satisfied, and the accumulated compressive stress in the compressive stress layer can be reduced. As a result, the yield in a cutting process of the chemically strengthened glass plate can be improved.

If the ratios $r_2/r_1$ and $r_3/r_2$ are less than 0.3, a stress tends to too drastically reduce on the surface side of the glass, and microcracks which may be generated on the glass plate during use may reduce the glass strength.

If the ratios $r_2/r_1$ and $r_3/r_2$ are more than 0.7, the slope of a stress pattern is becoming constant. Specifically, the compressive stress tends to reduce linearly towards the inside of the glass from the surface of the glass. Therefore, the effect of reducing the accumulated compressive stress in the compressive stress layer is less likely to be obtained.

In the chemically strengthened glass plate of the present invention, the surface compressive stress at a surface of the chemically strengthened glass plate is preferably 600 to 900 MPa.

A surface compressive stress of 600 to 900 MPa is a sufficient level of strength for chemically strengthened glass plates.

In the chemically strengthened glass plate of the present invention, the compressive stress layer at a surface of the chemically strengthened glass plate preferably has a depth of 5 to 25 μm.

A glass having a compressive stress layer having a depth of less than 5 μm cannot withstand commercial use because microcracks may be formed in use and such microcracks reduce the strength of the glass. On the other hand, a glass having a compressive stress layer having a depth of more than 25 μm may be difficult to cut by scribing.

In the chemically strengthened glass plate of the present invention, the chemically strengthened glass plate preferably has a thickness of 0.03 to 3 mm.

In general, the thinner the chemically strengthened glass plate, the higher the inner tensile stress to achieve a balance with an accumulated compressive stress in the compressive stress layer. However, the chemically strengthened glass plate of the present invention, with a small thickness, can be cut with good yield in a cutting process and has high strength.

In cases where such a chemically strengthened glass plate of the present invention is intended to be used for cover glasses for display devices, it is preferably as thin as possible to reduce the weight of final products (e.g. mobile products) and ensure the space for batteries or other components in device products. Unfortunately, however, too thin a glass plate may generate a large stress when it warps. On the other hand, too thick a glass plate increases the weight of final device products and degrades the visibility of display devices.

In the chemically strengthened glass plate of the present invention, the glass before the ion exchange is preferably made of soda-lime glass substantially composed of $SiO_2$: 65 to 75%, $Na_2O+K_2O$: 5 to 20%, CaO: 2 to 15%, MgO: 0 to 10%, and $Al_2O_3$: 0 to 5% on a mass basis.

In this case, soda-lime glass is advantageous in view of no increase in the production costs due to change in the material and no reduced production efficiency, differently from a glass suitable for chemical strengthening which is obtained by changing the materials or the like of soda-lime glass.

For example, to increase the amount of aluminum oxide in a composition (e.g. the design of the composition of aluminosilicate glass) is effective for increasing the ion exchange capacity, but is accompanied by not only increased material costs but also remarkable elevation of the melting temperature of the glass, which contributes to remarkably high production costs of the glass. Another effective way to increase the ion exchange capacity is to use MgO as the alkaline-earth component instead of CaO. This, however, also elevates the melting temperature of the glass, which leads to an increase in production costs.

In the chemically strengthened glass plate of the present invention, the ion exchange preferably includes:

a first step of contacting the glass plate with a first salt that includes alkali metal ions A and B at a proportion P of the alkali metal ions A as expressed as a molar percentage of the total amount of the alkali metal ions A and B; and a subsequent second step of contacting the glass plate with a second salt that includes alkali metal ions A and B at a proportion Q of the alkali metal ions A as expressed as a molar percentage of the total amount of the alkali metal ions A and B, where the proportion Q is smaller than the proportion P.

In the method of manufacturing a chemically strengthened glass plate of the present invention, the ion exchange includes:

a first step of contacting the glass plate with a first salt that includes alkali metal ions A and B at a proportion P of the alkali metal ions A as expressed as a molar percentage of the total amount of the alkali metal ions A and B; and a subsequent second step of contacting the glass plate with a second salt that includes alkali metal ions A and B at a proportion Q of the alkali metal ions A as expressed as a molar percentage of the total amount of the alkali metal ions A and B, where the proportion Q is smaller than the proportion P.

The surface compressive stress and the depth of the compressive stress layer obtained through the ion exchange in the chemical strengthening are affected by the temperature and the period of time for the chemical strengthening, and the type of a selected treatment liquid and the active property of the treatment liquid. Further, the surface compressive stress and the depth of the compressive stress layer of the chemically strengthened glass may depend on the state of the ion exchange in the glass. In particular, in the case of conventional one-step chemical strengthening, the surface compressive stress and the depth of the compressive stress layer are in a trade-off relationship, and are difficult to keep both to sufficient levels. On the contrary, two-step chemical strengthening (ion exchange) and appropriate selection of temperature, the period of time on treatment, and the composition of the treatment liquid make it possible to effectively enhance the effect of each step, thereby producing a chemically strengthened glass which can be cut and has a high surface compressive stress.

In the ion exchange described above, the composition of the surface layer of the glass is modified by ion exchange of the alkali metal ions A (e.g. sodium ions) with the alkali metal ions B (e.g potassium ions) in the first step, while the alkali metal ions A, which contribute to generation of a compressive stress, are left in the layer. The amount of the alkali metal ions B is larger in the surface layer modified in the first step than in the layer before the first step. Therefore, the surface layer modified in the first step has a higher strain point. As a result, the relaxation of the stress generated in the second step can be prevented. Thus, a chemically strengthened glass with a high surface compressive stress can be prepared. It is considered that two-step chemical strengthening allows formation of two types of stress patterns in a compressive stress layer.

In the method of manufacturing a chemically strengthened glass plate of the present invention, the compressive stress layer formed through the first step at a surface of the glass plate preferably has a depth of 5 to 23 μm.

If the depth of the compressive stress layer formed through the first step is too small, the composition of the surface layer of the glass is not sufficiently modified in the primary treatment, whereby the stress relaxation occurred in the secondary treatment may therefore not be sufficiently prevented. On the contrary, if the depth of the compressive stress layer formed through the first step is too large, the depth of the compressive stress layer finally formed through the secondary treatment becomes large, which adversely affects the cutting easiness of the glass. As described above, the stress relaxation in the secondary treatment can be prevented by performing the primary treatment in the present invention. However, glass is inherently impossible to completely prevent progress of stress relaxation. Therefore, a slight stress relaxation may occur in the secondary treatment, and thus the depth of the compressive stress layer finally remaining after the secondary treatment may be changed from the depth of the compressive stress layer formed through the primary treatment. On the contrary, it may be assumed that the amount of ions exchanged in the secondary treatment is larger than that of ions exchanged in the primary treatment, and the depth of the compressive stress layer formed through the second step is slightly deeper than the depth of the compressive stress layer obtained through the primary treatment. However, the depth of the compressive stress layer finally formed through the second step is only slightly changed from the depth of the compressive stress layer formed through the first step (the primary treatment). Since the cutting easiness of the obtained chemically strengthened glass is significantly affected by the depth of the compressive stress layer formed through the first step, it is important to control the depth of the compressive stress layer formed through the first step.

The depth of the compressive stress layer is preferably 5 to 23 μm.

In relation to the depth of the compressive stress layer formed through the first step, the temperature of the first salt and the period of time for contact of the glass plate with the first salt are controlled depending on the proportion P in the first salt.

In the method of manufacturing a chemically strengthened glass plate of the present invention, the proportion P is preferably 5 to 50 mol %.

If the proportion P in the first salt is too high, the composition of the surface layer of the glass is not sufficiently modified in the primary treatment (ion exchange in the first step), and the stress relaxation occurred in the secondary treatment (ion exchange in the second step) may therefore not be sufficiently prevented, and the surface is likely to become cloudy. On the other hand, if the proportion P in the first salt is too low, the composition of the surface layer of the glass tends to be sufficiently modified in the first step, but most of the alkali metal ions A in the glass are ion exchanged with the alkali metal ions B. As a result, ion exchange in the second step may not be accelerated, failing to give a desired surface compressive stress. If the proportion P is too low, a deeper compressive stress layer tends to be formed through the first step. This also adversely affects the cutting easiness of the resulting glass.

In method of manufacturing the chemically strengthened glass plate of the present invention, the proportion Q is preferably 0 to 10 mol %.

If the proportion Q in the second salt is more than 10 mol %, sufficient alkali metal ions B may not be introduced into the surface layer of the glass in the second step, and the alkali metal ions B are not sufficiently redispersed in the surface layer. As a result, a desired surface compressive stress cannot be obtained. Further, the slope of the stress pattern A becomes small.

Advantageous Effects of Invention

The chemically strengthened glass plate of the present invention has a good yield in a cutting process of the chemically strengthened glass plate and sufficient strength.

DESCRIPTION OF EMBODIMENTS

Figure 1:
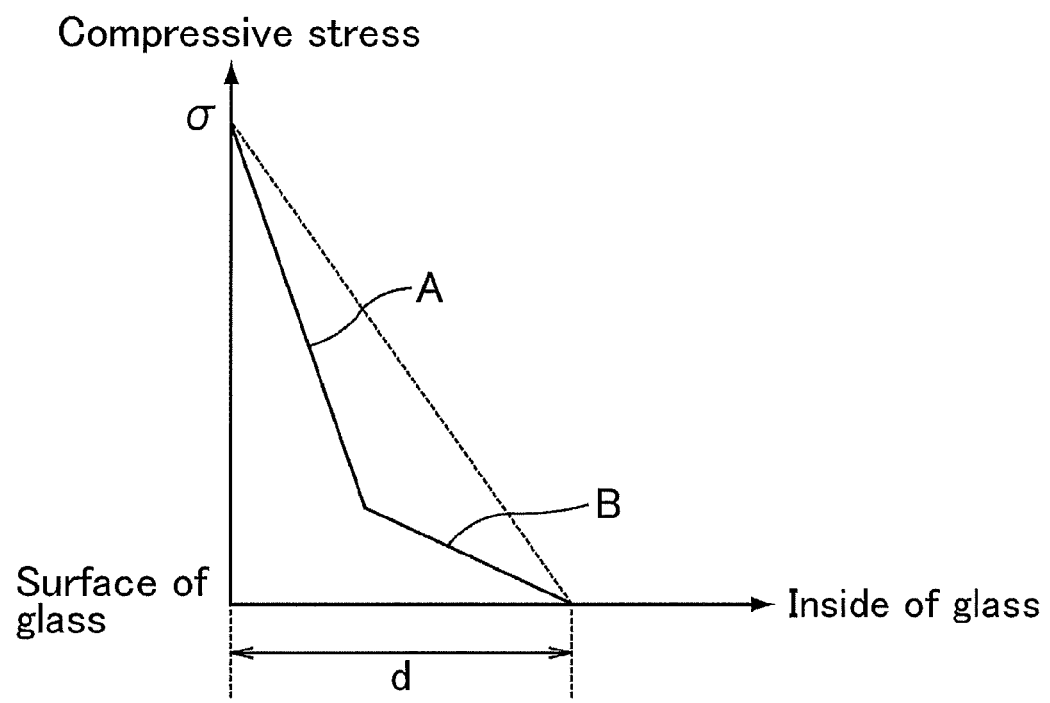
FIG. 1 is a graph schematically showing the relationship between slopes of stress patterns and an accumulated compressive stress in a compressive stress layer.
Figure 2:
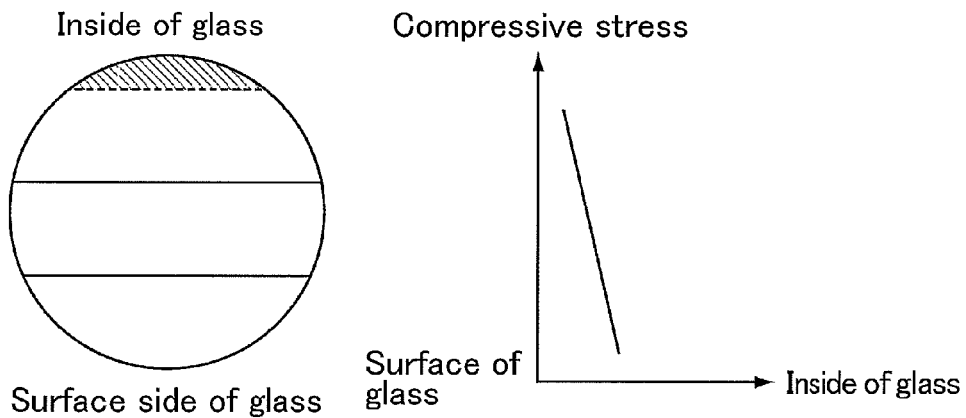
FIGS. 2(a), 2(b), and 2(c) are graphs each schematically showing the relationship of intervals between lines of an interference pattern and a slope of a stress pattern.
Figure 2:
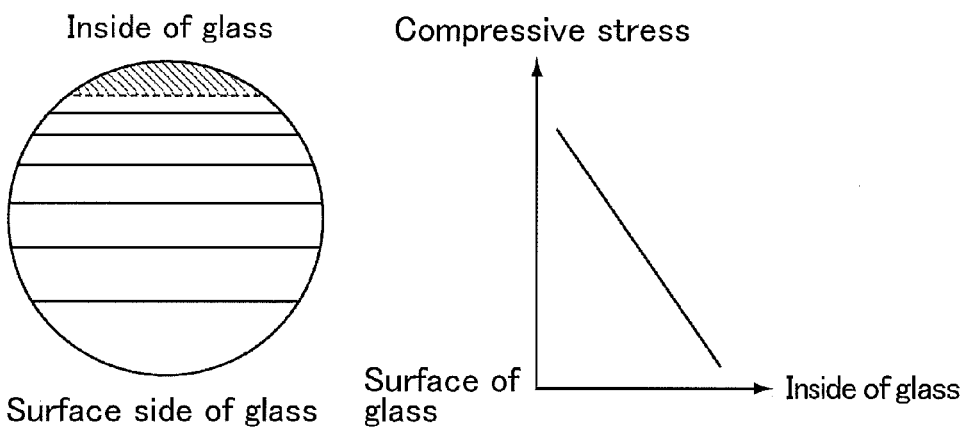
Figure 2:
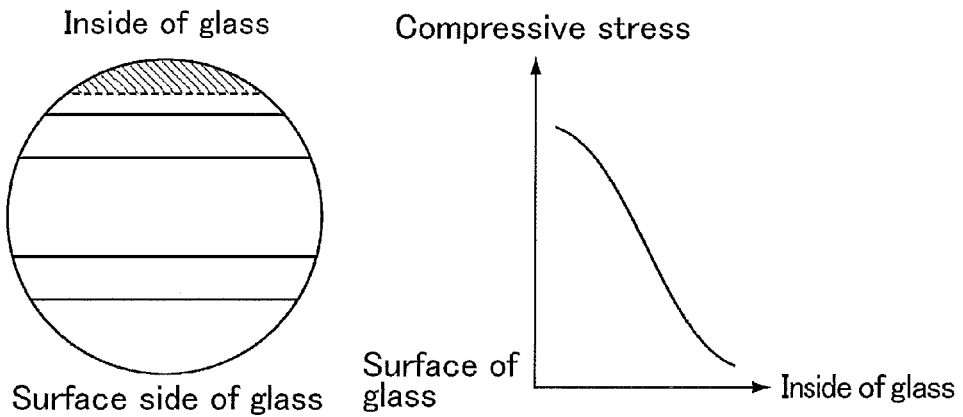

The following description is offered to specifically illustrate an embodiment of the present invention. It should be noted that the present invention is not limited only to this embodiment, and the embodiment can be appropriately altered within the scope of the present invention.

(Chemically Strengthened Glass Plate)

A chemically strengthened glass plate according to one embodiment of the present invention is manufactured by ion exchange of a surface of a glass plate to replace alkali metal ions A which are the largest in amount among all the alkali metal ion components of the glass with alkali metal ions B having a larger ionic radius than the alkali metal ions A.

In cases where the alkali metal ions A are, for example, sodium ions ($Na^+$ ions), the alkali metal ions B may be at least one species of ions selected from potassium ion ($K^+$ ion), rubidium ion ($Rb^+$ ion), and cesium ion ($Cs^+$ ion). In cases where the alkali metal ions A are sodium ions, the alkali metal ions B are preferably potassium ions.

In the ion exchange, one or two or more of nitrates, sulfates, carbonates, hydroxide salts, and phosphates containing at least the alkali metal ions B, may be used. In cases where the alkali metal ions A are sodium ions, nitrates containing at least potassium ions are preferred.

In the chemically strengthened glass plate according to one embodiment of the present invention, the glass before the ion exchange may be made of any of glass, such as soda-lime glass, aluminosilicate glass, or borosilicate glass, as long as it contains alkali metal ions, which are capable of ion exchanging. In particular, the glass before the ion exchange is preferably made of soda-lime glass substantially composed of $SiO_2$: 65 to 75%, $Na_2O+K_2O$: 5 to 20%, CaO: 2 to 15%, MgO: 0 to 10%, and $Al_2O_3$: 0 to 5% on a mass basis.

The expression "$Na_2O+K_2O$: 5 to 20%" herein means that the proportional amount of $Na_2O$ and $K_2O$ in total in the glass is 5 to 20% by mass.

$SiO_2$ is a major constituent of glass. If the proportional amount of $SiO_2$, is less than 65%, the glass has reduced strength and poor chemical resistance. On the other hand, if the proportional amount of $SiO_2$ is more than 75%, the glass becomes a highly viscous melt at high temperatures. Such a glass is difficult to form into a shape. Accordingly, the proportional amount should be in the range of 65 to 75%, and preferably 68 to 73%.

$Na_2O$ is an essential component that is indispensable for the chemical strengthening treatment. If the proportional amount of $Na_2O$ is less than 5%, sufficient ions are not exchanged, namely, the chemically strengthening treatment does not improve the strength very much.

On the other hand, if the proportional amount is more than 20%, the glass may have poor chemical resistance and poor weather resistance. Accordingly, the proportional amount should be in the range of 5 to 20%, preferably 5 to 18%, and more preferably 7 to 16%. $K_2O$ is not an essential component, but acts as a flux for the glass together with $Na_2O$ upon melting the glass, and acts also as an adjunct component for accelerating ion exchange when added in a small amount. However, when excessive $K_2O$ is used, $K_2O$ produces a mixed alkali effect with $Na_2O$ to inhibit movement of $Na^+$ ions. As a result, the ions are less likely to be exchanged. If the proportional amount of $K_2O$ is more than 5%, the strength is less likely to be improved by ion exchange. Accordingly, the proportional amount is preferably not more than 5%.

The proportional amount of $Na_2O+K_2O$ is 5 to 20%, preferably 7 to 18%, and more preferably 10 to 17%.

CaO improves the chemical resistance of the glass, and additionally reduces the viscosity of the glass in the molten state. For the purpose of improving the mass productivity of the glass, CaO is preferably present in an amount of not less than 2%. However, if the proportional amount exceeds 15%, it acts to inhibit movement of $Na^+$ ions. Accordingly, the proportional amount should be in the range of 2 to 15%, preferably 4 to 13%, and more preferably 5 to 11%.

MgO is also not an essential component, but is preferably used in place of a portion of CaO because it is less likely to inhibit movement of $Na^+$ ions than CaO. MgO, however, is not as effective as CaO in reducing the viscosity of the glass in the molten state. When MgO is used in an amount of more than 10%, it allows the glass to become highly viscous, which is a contributing factor to poor mass productivity of the glass. Accordingly, the proportional amount should be in the range of 0 to 10%, preferably 0 to 8%, and more preferably 1 to 6%.

$Al_2O_3$ is not an essential component, but improves the strength and the ion exchange capacity. If the proportional amount of $Al_2O_3$ is more than 5% on a mass basis, the glass becomes a highly viscous melt at high temperatures, and additionally is likely to be devitrified. Such a glass melt is difficult to form into a shape. Moreover, the ion exchange capacity is increased too much, and therefore a deep compressive stress may be formed. As a result, the chemical strengthening may make the glass difficult to cut. Accordingly, the proportional amount should be in the range of 0 to 5%, preferably 1 to 4%, and more preferably 1 to 3% (not including 3).

Regarding a chemically strengthened glass plate according to one embodiment of the present invention, the glass before the ion exchange is preferably substantially composed of the above components, but may further contains small amounts, specifically up to 1% in total, of other components such as $Fe_2O_3$, $TiO_2$, $CeO_2$, and $SO_3$.

The glass before the ion exchange preferably has a strain point of 450° C. to 550° C., and more preferably 480° C. to 530° C. If the glass has a strain point of lower than 450° C., it does not have heat resistance high enough to withstand the chemical strengthening. On the other hand, if the strain point is higher than 550° C., the glass has too high a melting temperature, which means that such glass plates cannot be produced efficiently and increase costs.

The glass before the ion exchange is preferably one formed by common glass forming processes such as a float process, a roll-out process, and a down-draw process. Among these, one formed by a float process is preferable.

The surface of the glass before the ion exchange prepared by such a forming process described above may remain as is, or may be roughened by hydrofluoric acid etching or the like to have functional properties such as antiglare properties.

The shape of the glass before the ion exchange is not particularly limited, and is preferably a plate shape. Incases where the glass has a plate shape, it may be a flat plate or a warped plate, and various shapes are included within the scope of the present invention. Shapes such as rectangular shapes and disc shapes are included within the definition of the flat plate in the present invention, and rectangular shapes are preferable among others.

The upper limit of the thickness of the chemically strengthened glass plate according to one embodiment of the present invention is not particularly limited, but is preferably 3 mm, more preferably 2 mm, still more preferably 1.8 mm, and particularly preferably 1.1 mm. The lower limit of the thickness of a chemically strengthened glass plate according to one embodiment of the present invention is also not particularly limited, but is preferably 0.03 mm, more preferably 0.1 mm, still more preferably 0.2 mm, and particularly preferably 0.3 mm.

The chemically strengthened glass plate according to one embodiment of the present invention has a surface compressive stress of not less than 600 MPa. The lower limit of the surface compressive stress may be 620 MPa, and further may be 650 MPa. A higher surface compressive stress is preferable, and the upper limit may be 900 MPa, 850 MPa, 800 MPa, or 750 MPa.

The chemically strengthened glass plate according to one embodiment of the present invention preferably has a compressive stress layer having a depth of 5 to 25 μm at the surface in terms of both damage resistance and cutting processability. The depth of the compressive stress layer is preferably 5 to 20 μm, more preferably 8 to 15 μm, still more preferably 8 to 13 μm, and particularly preferably 9 to 12 μm.

The surface compressive stress generated by ion exchange and the depth of the compressive stress layer formed by ion exchange herein are both measured by photoelasticity with a surface stress meter based on an optical waveguide effect. It should be noted that the measurement with the surface stress meter requires the refraction index and photoelasticity constant according to the glass composition of each glass before ion exchange.

The chemically strengthened glass preferably has a Vickers hardness of 5.0 to 6.0 GPa, more preferably 5.2 to 6.0 GPa, and further more preferably 5.2 to 5.8 GPa. Glasses having a Vickers hardness of less than 5.0 GPa have poor damage resistance, and therefore cannot withstand commercial use. On the other hand, a glass having a Vickers hardness of more than 6.0 GPa is difficult to cut, and thus adversely affect the yield in a cutting process of the chemically strengthened glass.

The chemically strengthened glass plate according to one embodiment of the present invention has a compressive stress layer containing two types of stress patterns A and B. The stress pattern A is a pattern of a surface portion of the glass plate, and the stress pattern B is a pattern of an inside of the glass plate.

The stress patterns satisfy the formula $S_A > S_B$ where $S_A$ represents a slope of the stress pattern A and $S_B$ represents a slope of the stress pattern B when the stress patterns A and B are each approximated by a linear function.

In the chemically strengthened glass plate according to one embodiment of the present invention, when an interference pattern of the chemically strengthened glass plate is observed with a surface stress meter based on a principle of an optical waveguide effect, at least one of values $r_2/r_1$ and $r_3/r_2$ is preferably in the range of 0.3 to 0.7, where $r_1$ represents an interval between a line of the interference pattern closest to the surface of the glass, and a line of the interference pattern second closest to the surface; $r_2$ represents an interval between the line of the interference pattern second closest to the surface, and a line of the interference pattern third closest to the surface; and $r_3$ represents an interval between the line of the interference pattern third closest to the surface, and a line of the interference pattern fourth closest to the surface.

In the chemically strengthened glass plate according to one embodiment of the present invention, it is more preferable that at least the value $r_2/r_1$ is in the range of 0.3 to 0.7, and it is still more preferable that both the values $r_2/r_1$ and $r_3/r_2$ are in the range of 0.3 to 0.7.

The ratio $r_3/r_2$ may be in the range of 0.3 to 0.7, and the ratio $r_2/r_1$ may not be in the range of 0.3 to 0.7. This is because the compressive stress at the outermost surface tends to slightly relax due to the effect of gradual cooling in the production process. The inner tensile stress tends to be reduced also in such a case, as long as the ratio $r_3/r_2$ is in the range of 0.3 to 0.7. Therefore, such a case is to be considered as falling within the scope of the present invention.

Observation of an interference pattern of a chemically strengthened glass plate using a surface stress meter is explained below.

Figure 3:
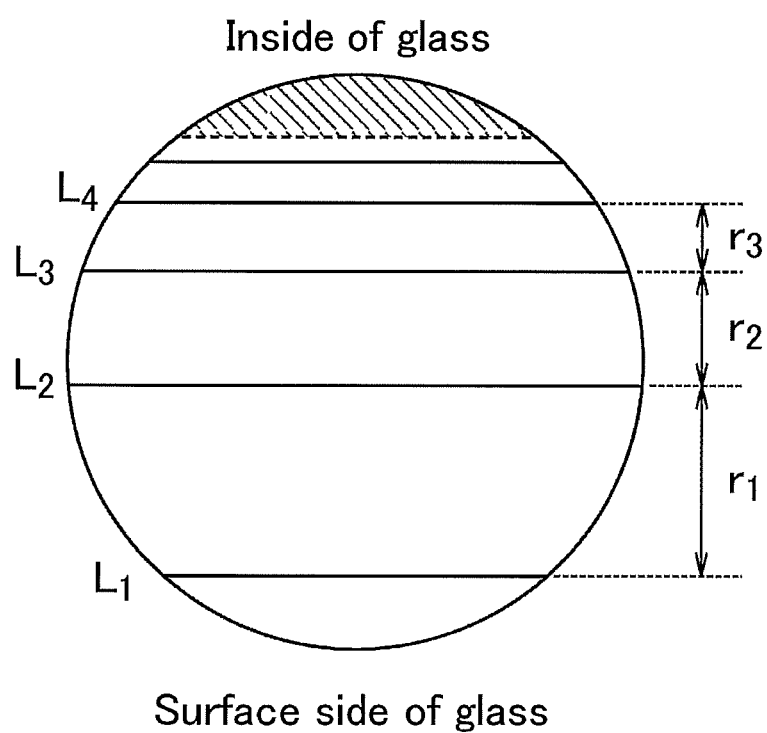
FIG. 3 is a schematic view of an example of an interference pattern in the field of a surface stress meter.

FIG. 3 is a schematic view of an example of an interference pattern in the field of a surface stress meter.

The lower portion of FIG. 3 shows a surface side of a glass, and the upper portion of FIG. 3 shows an inside of a glass.

As shown in FIG. 3, the interval $r_1$ between a line of the interference pattern closest to the surface of the glass, and a line of the interference pattern second closest to the surface; the interval $r_2$ between the line of the interference pattern second closest to the surface, and a line of the interference pattern third closest to the surface; and the interval $r_3$ between the line of the interference pattern third closest to the surface, and a line of the interference pattern fourth closest to the surface are measured. The values $r_2/r_1$ and $r_3/r_2$ are calculated from the resulting intervals $r_1$, $r_2$, and $r_3$.

In the chemically strengthened glass plate according to one embodiment of the present invention, the value $r_2/r_1$ or $r_3/r_2$ calculated by the above method is preferably in the range of 0.3 to 0.7. The lower limit of the value $r_2/r_1$ or $r_3/r_2$ is preferably 0.35, and more preferably 0.4. The upper limit of the value $r_2/r_1$ or $r_3/r_2$ is preferably 0.65, and more preferably 0.63.

The chemically strengthened glass plate according to one embodiment of the present invention is preferably used for cover glasses for display devices.

The term "cover glass for display devices" herein is not limited to only those used alone, and is intended to also include, for example, cover glasses having functions of a cover and a substrate in one cover glass, used as touch sensor substrates (e.g. cover glasses called "One Glass Solution" or "integrated cover glasses").

Such cover glasses for display devices can be manufactured by cutting a chemically strengthened glass plate according to one embodiment of the present invention.

Such a chemically strengthened glass plate is a glass plate larger than cover glasses, and its entire main surface and all the side faces are chemically strengthened before the cutting process. This chemically strengthened glass plate can be cut into a plurality of cover glasses by the cutting process. Thus, a plurality of cover glasses can be efficiently produced at the same time from a single large glass plate. The cover glasses obtained by cutting a glass plate have side faces composed of regions where a compressive stress layer is formed and regions where no compressive stress layer is formed.

The side faces of the cover glasses are preferably faces formed by physical processing (not only cutting or breaking, but also chamfering) such as laser scribing, mechanical scribing, and brush polishing, or chemical processing (chemical cutting) using a hydrofluoric acid solution.

The main surface of the cover glasses for display devices may be provided with anti-fingerprint properties, anti-glare properties, or desired functions by surface coating with a chemical, microprocessing, attaching a film to the surface, or the like. Alternatively, on the main surface, an indium tin oxide (ITO) membrane and then a touch sensor may be formed, or printing may be performed according to the color of the display devices. The main surface may be partially subjected to a processing for making holes or the like. The shape and size of these cover glasses may not be limited to simple rectangular shapes, and various shapes according to the designed shape of the display devices are acceptable such as processed rectangular shapes with round corners.

(Method of Manufacturing Chemically Strengthened Glass Plate)

The method of manufacturing a chemically strengthened glass plate according to one embodiment of the present invention includes a first step of contacting a glass plate with a first salt that includes the alkali metal ions A and B at a proportion P of the alkali metal ions A as expressed as a molar percentage of the total amount of the alkali metal ions A and B; and a subsequent second step of contacting the glass plate with a second salt that includes the alkali metal ions A and B at a proportion Q of the alkali metal ions A as expressed as a molar percentage of the total amount of the alkali metal ions A and B. Here, the proportion Q is smaller than the proportion P.

Use of such a first salt allows the surface layer of the glass to be modified so that the layer contains both the alkali metal ions A (e.g. sodium ions) and B (e.g. potassium ions), in the first step. As a result, the relaxation of the compressive stress generated in the second step can be prevented. That is, the surface compressive stress generated by the ion exchange in the second step is slightly relaxed and mostly left because the glass article has already been subjected to the first step. Therefore, a high surface compressive stress can be obtained. It is considered that two-step chemical strengthening allows formation of two types of stress patterns in a compressive stress layer.

The expression "contacting a glass plate with a salt" used for the first and second steps means to contact the glass plate with a salt bath or submerge the glass plate in a salt bath. Thus, the term "contact" used herein is intended to include "submerge" as well.

The contact with a salt can be accomplished by, for example, directly applying the salt in a paste form to the glass plate, spraying the salt in an aqueous solution form, submerging the glass plate into a molten salt heated to its melting point or higher. Among these, submerging into a molten salt is preferable.

Specific examples of the alkali metal ions A and B are as described above.

The salt may be one of or a mixture of two or more of nitrates, sulfates, carbonates, hydroxide salts, and phosphates.

A salt containing the alkali metal ions A may preferably be a sodium nitrate molten salt, and a salt containing the alkali metal ions B may preferably be a potassium nitrate molten salt. Therefore, a salt containing the alkali metal ions A and B may preferably be a molten salt composed of a mixture of sodium nitrate and potassium nitrate.

The proportions P and Q each represent a proportion of the alkali metal ions A as expressed as a molar percentage of the total amount of the alkali metal ions A and B.

If the proportion P in the first salt is too high, the surface of the glass plate is less likely to be modified in the first step, and is further likely to become cloudy, which avoids improvement in reliability of the glass strength. On the contrary, if the proportion P in the first salt is too low, the composition of the surface layer of the glass plate tends to be too much modified in the first step, and most alkali metal ions A in the glass are therefore ion exchanged with the alkali metal ions B. As a result, ion exchange may not be accelerated in the second step, failing to give a desired compressive stress. If the proportion P is too low, a deeper compressive stress layer tends to be formed through the first step. This also adversely affects the cutting easiness of the resulting glass.

The proportion P is preferably 5 to 50 mol %. The lower limit of the proportion P is more preferably 15 mol % and still more preferably 20 mol %. The upper limit of the proportion P is more preferably 40 mol % and still more preferably 35 mol %.

If the proportion Q in the second salt is more than 10 mol %, sufficient alkali metal ions B may not be introduced into the surface layer of the glass in the second step, and driving force of redispersion of the alkali metal ions B in the surface layer tends to be weakened. Therefore, a desired surface compressive stress cannot be obtained.

Thus, the proportion Q is preferably 0 to 10 mol %. The upper limit of the proportion Q is more preferably 2 mol % and still more preferably 1 mol %. Thus, the second salt may contain only the alkali metal ions B (e.g. potassium ions) as a cation, and may not substantially contain the alkali metal ions A (e.g. sodium ions).

Although the first and second salts are each a pure salt of the alkali metal ion A and/or the alkali metal ion B in the above description, this embodiment does not preclude the presence of stable metal oxides, impurities, and other salts that do not react with the salts, provided that they do not impair the purpose of the present invention. For example, the first or second salt may contain Ag ions or Cu ions as long as the proportion Q is in the range of 0 to 2 mol %.

The depth of the compressive stress layer formed through the first step is preferably 5 to 23 μm, as described above. The depth is more preferably 7 to 20 μm and still more preferably 10 to 18 μm.

In order to make a compressive stress layer with the above depth, the temperature in the first step (temperature of the first salt) is preferably controlled depending on the proportion P in the first salt.

Too high a temperature in the first step (temperature of the first salt) is likely to make the surface of the glass cloudy. In addition, a deeper compressive stress layer may be formed, which may adversely affect the cutting easiness of the resulting glass. On the other hand, at too low a first salt temperature, ion exchange in the first step may not be accelerated, the surface of the glass is less likely to be modified in the first step, and a compressive stress layer having a desired depth may not be formed.

Accordingly, the first salt temperature is preferably 400° C. to 530° C. The lower limit of the first salt temperature is more preferably 410° C. and further more preferably 430° C. The upper limit of the first salt temperature is more preferably 515° C., still more preferably 500° C., and particularly preferably 485° C.

It is preferable that the temperature in the second step (temperature of the second salt) is controlled such that a compressive stress layer having a depth of 5 to 25 μm is formed through the second step.

Too high a temperature in the second step (temperature of the second salt) may relax the compressive stress generated in the first step, and a deeper compressive stress layer may be formed in the second step, which may adversely affect the cutting easiness of the resulting glass. On the other hand, too low a second salt temperature fails to accelerate ion exchange in the second step. Consequently, a high surface compressive stress may not be generated in the second step, and the alkali metal ions B are less likely to be redispersed, failing to give a compressive stress layer having a desired depth.

Accordingly, the second salt temperature is preferably 380° C. to 500° C. The lower limit of the second salt temperature is more preferably 390° C., further more preferably 400° C., and particularly preferably 410° C. The upper limit of the second salt temperature is more preferably 490° C., still more preferably 480° C., and particularly preferably 460° C.

In the method of manufacturing a chemically strengthened glass plate according to one embodiment of the present invention, a compressive stress layer with a depth of 5 to 23 μm is preferably formed at the surface of the glass through the first step using the first salt having a proportion P of 5 to 50 mol % in the first step.

Further, a second salt having a proportion Q of 0 to 10 mol % is preferably used in the second step.

A total time period of the contact of the glass plate with the first salt in the first step and the contact of the glass plate with the second salt in the second step is preferably 1 to 12 hours and more preferably 2 to 6 hours.

Specifically, too long a contact of the glass plate with the first salt tends to relax the compressive stress generated in the first step, and additionally tends to provide a deeper compressive stress layer. This adversely affects the cutting easiness of the resulting glass.

On the other hand, too short a contact of the glass plate with the first salt may not produce a sufficient effect of modifying the surface layer of the glass in the first step, and therefore tends to cause stress relaxation in the second step. The time period of the contact of the glass plate with the first salt in the first step is preferably 0.5 to 4 hours. The time period is preferably 0.5 to 8 hours, more preferably 1 to 6 hours, and still more preferably 1 to 4 hours.

In the second step, it is preferable to reduce the relaxation of the stress generated by the ion exchange to a minimum. However, a longer contact of the glass plate with the salt increases the relaxation of the stress. Additionally, a longer contact tends to provide a deeper compressive stress layer in the second step. This also adversely affects the cutting easiness of the resulting glass. On the other hand, too short a contact of the glass plate with the second salt fails to allow the alkali metal ions A and B to be exchanged sufficiently, and therefore a desired compressive stress may not be generated. Thus, the time period of the contact of the glass plate with the second salt in the second step is preferably 0.5 to 8 hours, more preferably 0.5 to 6 hours, and still more preferably 0.5 to 3 hours.

All of the temperatures and the contact times in the first and second steps described above are associated with the ion exchange amount (which is defined as a value calculated by dividing the absolute value of the mass difference of the glass plate before and after the chemical strengthening by the surface area of the glass plate). Namely, the temperatures and the contact times are not limited to the above ranges, and may be varied without any limitation, provided that substantially equivalent ion exchange amounts are achieved in the respective steps.

EXAMPLES

The following examples are offered to more specifically illustrate the embodiment of the present invention. It should be noted that the present invention is not limited only to these examples.

Example 1

(1) Preparation of Chemically Strengthened Glass Plate

As a glass plate before ion exchange (chemical strengthening), a 0.7-mm thick soda-lime glass plate with 400 mm×500 mm sizes ($SiO_2$: 71.6%, $Na_2O$: 12.5%, $K_2O$: 1.3%, CaO: 8.5%, MgO: 3.6%, $Al_2O_3$: 2.1%, $Fe_2O_3$: 0.10%, $SO_3$: 0.3% (on a mass basis)) (hereinafter, referred to as glass base plate) was produced by a float process.

The glass base plate prepared above was submerged in a molten salt (first salt, proportion P: 30 mol %) bath composed of a mixture of 70 mol % of potassium nitrate and 30 mol % of sodium nitrate at a constant temperature of 483° C. for 120 minutes, as a first step.

Subsequently, the glass base plate was taken out from the bath, and its surface was washed and dried.

In a subsequent second step, the dried glass base plate was submerged in a molten salt (second salt, proportion Q: 0 mol %) bath substantially composed of 100 mol % of potassium nitrate at a constant temperature of 443° C. for 60 minutes.

Subsequently, the glass base plate was taken out from the bath, and its surface was washed and dried.

Thus, through the above steps, a chemically strengthened glass plate according to Example 1 was prepared.

(2) Evaluation of Chemically Strengthened Glass Plate (2-1) Measurement of Surface Compressive Stress and Depth of Compressive Stress Layer The number of lines of interference pattern and the intervals between the lines of the obtained chemically strengthened glass plate were observed, and the surface compressive stress and the depth of the compressive stress layer formed at the surface of the glass were measured using a surface stress meter (FSM-60V, produced by Toshiba Glass Co., Ltd. (currently Orihara Industrial Co., Ltd.)). The refraction index and photoelasticity constant of the glass composition of the soda-lime glass used for the measurement with the surface stress meter were 1.52 and 26.8 ((nm/cm)/MPa), respectively. A sodium lamp was used as light source.

The results of the measurement showed that the surface compressive stress and the depth of the compressive stress layer of the chemically strengthened glass plate according to Example 1 were 805 MPa and 12 μm, respectively. The depth of the compressive stress layer formed through the first step was 14 μm.

(2-2) Calculation of Values $r_2/r_1$ and $r_3/r_2$

The interval $r_1$ between a line $L_1$ of the interference pattern closest to the surface of the glass, and a line $L_2$ of the interference pattern second closest to the surface; the interval $r_2$ between the line $L_2$ of the interference pattern second closest to the surface, and a line $L_3$ of the interference pattern third closest to the surface; and the interval $r_3$ between the line $L_3$ of the interference pattern third closest to the surface, and a line $L_4$ of the interference pattern fourth closest to the surface were measured.

The values $r_2/r_1$ and $r_3/r_2$ are calculated from the resulting intervals $r_1$, $r_2$, and $r_3$. The results were $r_2/r_1$=0.66 and $r_3/r_2$=0.61.

(2-3) Evaluation of Cutting Easiness

The obtained chemically strengthened glass plate was subjected to scribing (load weight: 2 kg) and a segmentation test according to a general cutting manner using a mechanical scriber with a commercially-available carbide wheel glass cutter. The results showed that the cutting easiness and the yield in a cutting process were as good as those in Comparative Example 1.

The chemically strengthened glass plate according to Example 1 with a high surface compressive stress generally has a high inner tensile stress, and is therefore difficult to be cut and has a low yield in a cutting process. For example, the depth of the compressive stress layer of the chemically strengthened glass plate according to Example 1 is similar to the depth of the compressive stress layer of the chemically strengthened glass plate according to Comparative Example 1, whereas the surface compressive stress in Example 1 significantly increases. Therefore, if a conventional stress pattern had been formed in Example 1, it would have been difficult to cut the glass plate and the yield in a cutting process would have been low. However, since the values $r_2/r_1$ and $r_3/r_2$ were controlled in a specific range in the chemically strengthened glass plate according to Example 1, it was confirmed that the glass plate could be easily cut and had a good yield in a cutting process.

Example 2

A chemically strengthened glass plate was prepared in the same manner as in Example 1 except that the temperature of and the proportion P in the first salt used in the first step, and the temperature of and the proportion Q in the second salt used in the second step were changed as shown in Table 1. The obtained chemically strengthened glass plate was evaluated. Table 1 also shows the depth of the compressive stress layer obtained through the first step.

TABLE 1

| | Chemical strengthening condition | | | | | | | Evaluation of chemically strengthened glass plate | | | |
|---|---|---|---|---|---|---|---|---|---|---|---|
| | First step | | | | Second step | | | | | Ratio of intervals between lines of interference pattern | |
| | Proportion P | Temperature | Time period | Depth of compressive stress layer obtained through first step | Proportion Q | Temperature | Time period | Surface compressive stress | Depth of compressive stress layer | | |
| | (mol %) | (° C.) | (min) | (μm) | (mol %) | (° C.) | (min) | (MPa) | (μm) | $r_2/r_1$ | $r_3/r_2$ |
| Example 1 | 30 | 483 | 120 | 14 | 0 | 443 | 60 | 805 | 12 | 0.66 | 0.61 |
| Example 2 | 20 | 443 | 120 | 8 | 0 | 383 | 60 | 680 | 8 | 0.44 | |
| Comparative Example 1 | 0 | 463 | 90 | | | | | 550 | 12 | 0.86 | 0.79 |
| Comparative Example 2 | 0 | 443 | 120 | | | | | 570 | 10 | 0.86 | 0.88 |
| Comparative Example 3 | 3 | 475 | 70 | | | | | 470 | 12 | 0.78 | 0.74 |
| Comparative Example 4 | 0 | 483 | 60 | | | | | 510 | 12 | 0.92 | 0.82 |
| Comparative Example 5 | 0 | 443 | 240 | | | | | 550 | 15 | 0.91 | 0.90 |
| Comparative Example 6 | 0 | 443 | 360 | | | | | 555 | 16 | 0.88 | 0.89 |
| Comparative Example 7 | 0 | 463 | 180 | | | | | 510 | 18 | 1.00 | 0.92 |

Examples 3 to 9

Chemically strengthened glass plates were obtained through the first step in the same manner as in Example 1 except that the temperature of the salt in the first step was controlled in the range of 400° C. to 530° C. depending on the proportion P so that the compressive stress layer obtained through the first step on the surface of the glass had a specific depth (5 to 23 μm).

Next, the obtained chemically strengthened glass plates were subjected to the second step in the same manner as in Example 1 except that the temperature of the salt was controlled in the range of 380° C. to 500° C. depending on the proportion Q. Thus, chemically strengthened glass plates having a surface compressive stress of not less than 600 MPa and a compressive stress layer with a depth of 5 to 25 μm formed at the surface of the glass were obtained through the second step.

A total time period of the contact of the glass plate with the first salt in the first step and the contact of the glass plate with the second salt in the second step was controlled in the range of 1 to 12 hours.

TABLE 2

| | Chemical strengthening condition | | | | Evaluation of chemically strengthened glass plate | | | |
|---|---|---|---|---|---|---|---|---|
| | First step | | | | Surface compressive stress | Depth of compressive stress layer | Ratio of intervals between lines of interference pattern | |
| | Proportion P | Depth of compressive stress layer obtained through first step | Second step Proportion Q | | | | | |
| | (mol %) | (μm) | (mol %) | | (MPa) | (μm) | $r_2/r_1$ | $r_3/r_2$ |
| Example 3 | 20 | 7 | 0 | | 710 | 9 | 0.56 | |
| Example 4 | 23 | 14 | 0.5 | | 650 | 11 | 0.63 | |
| Example 5 | 35 | 15 | 0.1 | | 675 | 12 | 0.58 | 0.48 |
| Example 6 | 20 | 14 | 0 | | 760 | 12 | 0.61 | 0.65 |
| Example 7 | 30 | 15 | 0 | | 780 | 13 | 0.61 | 0.60 |
| Example 8 | 20 | 15 | 0 | | 745 | 14 | 0.61 | 0.68 |
| Example 9 | 30 | 23 | 0 | | 740 | 16 | 0.58 | 0.55 |

The surface compressive stresses, the depths of the compressive stress layers, and the ratios ($r_2/r_1$ and $r_3/r_2$) of intervals between lines of interference patterns, of the chemically strengthened glass plates according to Examples 2 to 9 are shown in Tables 1 and 2. The compressive stress layers of the chemically strengthened glass plates according to Examples 2 to 9 have depths similar to one another. It was assumed that such chemically strengthened glass plates had a lower yield in a cutting process as compared to a chemically strengthened glass having one stress pattern manufactured by a conventional one-step chemical strengthening. However, the yields in a cutting process of the chemically strengthened glass plates according to Examples 2 to 9 were as good as conventional one.

Comparative Example 1

In Comparative Example 1, one-step chemical strengthening was performed.

That is, a glass base plate prepared as in Example 1 was submerged in a molten salt bath substantially composed of 100 mol % of potassium nitrate at a constant temperature of 463° C. for 90 minutes.

Thus, through the above steps, a chemically strengthened glass plate according to Comparative Example 1 was prepared.

The obtained chemically strengthened glass plate was evaluated as in Example 1.

The results of the measurement showed that the surface compressive stress and the depth of the compressive stress layer of the chemically strengthened glass plate according to Comparative Example 1 were 550 MPa and 12 μm, respectively.

The values $r_2/r_1$ and $r_3/r_2$ were calculated from the intervals $r_1$, $r_2$, and $r_3$ as in Example 1. The results were $r_2/r_1=0.86$ and $r_3/r_2=0.79$.

The obtained chemically strengthened glass plate was subjected to scribing (load weight: 2 kg) and a segmentation test according to a general cutting manner using a mechanical scriber with a commercially-available carbide wheel glass cutter. The results showed that the glass plate was able to be cut without any difficulty and the yield in a cutting process was favorably not less than 98%.

The chemically strengthened glass plate according to Comparative Example 1 can be cut without any difficulty and has a good yield in a cutting process, but has a low surface compressive stress. Therefore, the chemically strengthened glass plate is considered to have insufficient strength.

Comparative Examples 2 to 7

Chemically strengthened glass plates were prepared as in Comparative Example 1 except that the temperature of and the proportion P in the first salt in the first step were changed according to Table 1. The obtained chemically strengthened glass plates were evaluated.

The surface compressive stresses, the depths of the compressive stress layers, and the ratios ($r_2/r_1$ and $r_3/r_2$) of the intervals between lines of interference patterns of the chemically strengthened glass plates according to Comparative Examples 2 to 7 are shown in Table 1.

The chemically strengthened glass plates of Comparative Examples 2 to 7 can be cut without any difficulty and each have a good yield in a cutting process, similar to the chemically strengthened glass plate according to Comparative Example 1, but have a low surface compressive stress. Therefore, the chemically strengthened glass plates of Comparative Examples 2 to 7 are considered to have insufficient strength.

The invention claimed is:

1. A chemically strengthened glass plate manufactured by ion exchange of a surface of a glass plate to replace alkali metal ions A which are largest in amount among all alkali metal ion components of the glass plate with alkali metal ions B having a larger ionic radius than the alkali metal ions A, the chemically strengthened glass plate having:
   a surface compressive stress of not less than 600 MPa at a surface of the chemically strengthened glass plate; and
   a compressive stress layer containing two types of stress patterns X and Y, the stress pattern X being a stress pattern of a surface portion of the glass plate, the stress pattern Y being a stress pattern of an inside of the glass plate,
   wherein the stress patterns satisfy the formula $S_A > S_B$ where $S_A$ represents a slope of the stress pattern X and $S_B$ represents a slope of the stress pattern Y when the stress patterns X and Y are each approximated by a linear function,
   wherein, when an interference pattern of the chemically strengthened glass plate is observed with a surface stress meter based on a principle of an optical waveguide effect, at least one of values $r_2/r_1$ and $r_3/r_2$ is in a range of 0.3 to 0.7, where $r_1$ represents an interval between a line of an interference pattern closest to the surface of the glass, and a line of an interference pattern second closest to the surface of the glass; $r_2$ represents an interval between the line of an interference pattern second closest to the surface of the glass, and a line of an interference pattern third closest to the surface of the glass; and $r_3$ represents an interval between the line of an interference pattern third closest to the surface of the glass, and a line of an interference pattern fourth closest to the surface of the glass,
   wherein the compressive stress layer at the surface of the chemically strengthened glass plate has a depth of 5 to 25 μm.

2. The chemically strengthened glass plate according to claim 1,
   wherein the surface compressive stress at the surface of the chemically strengthened glass plate is 600 to 900 MPa.

3. The chemically strengthened glass plate according to claim 1,
   wherein the chemically strengthened glass plate has a thickness of 0.03 to 3 mm.

4. The chemically strengthened glass plate according to claim 1,
   wherein the glass before the ion exchange is made of soda-lime glass substantially composed of $SiO_2$: 65 to 75%, $Na_2O+K_2O$: 5 to 20%, CaO: 2 to 15%, MgO: 0 to 10%, and $Al_2O_3$: 0 to 5% on a mass basis.

5. The chemically strengthened glass plate according to claim 1,
   wherein the ion exchange includes:
   a first step of contacting the glass plate with a first salt that includes alkali metal ions A and B at a proportion P of the alkali metal ions A as expressed as a molar percentage of a total amount of the alkali metal ions A and B; and
   a subsequent second step of contacting the glass plate with a second salt that includes alkali metal ions A and B at a proportion Q of the alkali metal ions A as expressed as a molar percentage of the total amount of the alkali metal ions A and B, where the proportion Q is smaller than the proportion P.

6. A method of manufacturing the chemically strengthened glass plate according to claim 1,
   wherein the ion exchange includes:
   a first step of contacting the glass plate with a first salt that includes alkali metal ions A and B at a proportion P of the alkali metal ions A as expressed as a molar percentage of the total amount of the alkali metal ions A and B; and
   a subsequent second step of contacting the glass plate with a second salt that includes alkali metal ions A and B at a proportion Q of the alkali metal ions A as expressed as a molar percentage of the total amount of the alkali metal ions A and B, where the proportion Q is smaller than the proportion P.

7. The method according to claim 6, wherein the compressive stress layer formed through the first step at a surface of the glass plate has a depth of 5 to 23 μm.

8. The method according to claim 6, wherein the proportion P is 5 to 50 mol%.

9. The method according to claim 6, wherein the proportion Q is 0 to 10 mol%.

* * * * *